April 9, 1963 C. M. ZOUBEK 3,084,784
CONVEYOR CONTROLS
Filed June 8, 1960
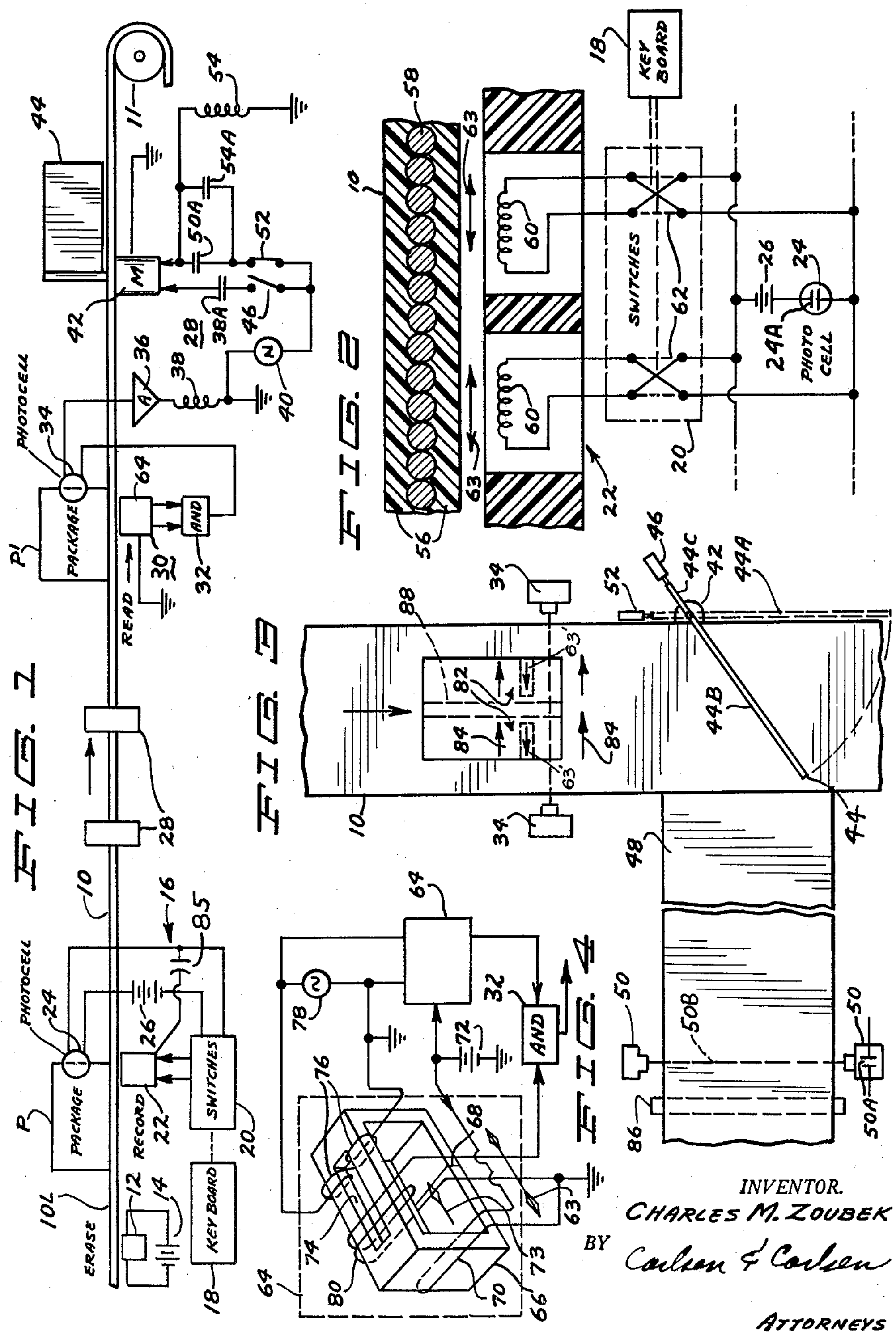
INVENTOR.
CHARLES M. ZOUBEK
BY Carlsen & Carlsen
ATTORNEYS United States Patent Office 3,084,784
Patented Apr. 9, 1963

3,084,784
CONVEYOR CONTROLS

Charles M. Zoubek, Roseville, Minn., assignor to Standard Conveyor Company, North St. Paul, Minn., a corporation of Minnesota Filed June 8, 1960, Ser. No. 34,807
6 Claims. (Cl. 198—38)

This invention relates to conveying systems and more particularly to control means for selectively removing items being conveyed from the conveyors and which includes a magnetic record media integrally associated with each conveying means.

Endless belt type of conveying systems are quite well-known and often include automatic or semi-automatic item diverting mechanisms for selectively transferring an item, package or container being conveyed from one belt to another. In such systems it is not uncommon that one belt or conveying means has a plurality of discharge or diverter stations. In providing an automatic system it is necessary that some form of control be utilized which is responsive to the progressive locations of the conveyed items for instructing or causing a selected diverter to be actuated for causing selected items to be transferred from the belt. Such controls can take the form of either a mechanical or an electrical analogue of or comprise a digital record of the items respective location progressions. It has been the practice to utilize information storage media which is separate and distinct from the conveying system, as such, and are synchronized with the conveying system by motion sensing devices. Due to slippage, creep, build-up-on-the-pulley and the like, it is very difficult, if not impossible, to maintain the synchronism between the belt and the information storage device. It should be apparent that the absolute error in the synchronism will increase with the length of the belt or belts used in the system.

Accordingly it is a primary object of this invention to provide an improved conveyor control wherein the information storage media is integrally associated with the conveying means such that the media forms a part of the means.

It is another object of this invention to provide an improved conveyor control that provides a random information memory media and "sensing means" that is operative irrespective of the conveying means speed or variations thereof and including stopping and starting thereof.

It is a further object of this invention to provide an improved conveyor control which records predetermined information indicating signals on the conveying means such that a position of the item being conveyed is indicated by such recording.

These and other more detailed and specific objects will be disclosed in the course of the following specification, reference being had to the accompanying drawings, in which—

FIG. 1 is an abbreviated schematic side view of a simplified conveying system embodying the teachings of the present invention.

FIG. 2 is a combined schematic diagram of an exemplary recording station together with a transverse cross sectional view of a conveyor belt usable by the present invention.

FIG. 3 is a schematic plan view of a diverter station which may be used by the present invention.

FIG. 4 is a schematic diagram of the static magnetization sensing means used in the FIG. 3 illustrated station and including a prospective view of a magnetic sensing transducer.

Referring more particularly now to the drawing a greatly simplified conveying system is illustrated which uses a two binary-digit or bit address code and has only three diverter stations. It is understood that in practicing the present invention more complicated and extensive conveying systems will be constructed and that the simplicity of the present illustration is intended to more clearly point out the invention. The illustrated system includes the partially illustrated endless belt 10 driven by suitable driving means 11 for causing the belt to move in the direction of the arrow of FIG. 1 on rollers not shown. The belt 10 has the later described magnetic memory means embedded therein for recording the two bit code. An erase station 12 is provided at the loading end 10L of the belt 10 for causing the memory media to be magnetized in a first direction as the belt passes the station. A battery source 14 may be used to provide a constant current to the erase station resulting in a constant and saturating magnetic flux to be presented within the belt 10 memory media.

Spaced downstream from the station 12 is a recording station 16 which is operative to selectively change the residual magnetization of predetermined portions of the belt memory media. A keyboard 18 of usual design forms an operator's position adjacent to and to one side of the conveyor belt 10. As the packages are placed on the belt 10, an operator observes and notes the designated package destination and operates the keyboard for encoding the destination as will become apparent. The keyboard 18 is operative to actuate a plurality of later described encoding switches which are individually connected to the respective recording heads in the assembly 22 and are disposed immediately below the belt 10. The keyboard 18 is actuated before the package "P" leading edge is adjacent the photo cell 24 which acts as a normally open electrical switch and automatically closes, i.e., presents a low impedance, as the package "P" moves adjacent thereto. The package provides a change in light intensity to actuate the cell 24. At this time the battery 26 is effectively connected through the cell 24 to the switches 20 for automatically recording the destination code into the belt 10 as indicated by the keyboard 18. The detailed operation of this automatic recording will be later described.

As the package "P" is conveyed by the belt 10 in the direction of the arrow, it may pass through one or more diverter stations 28 before leaving the conveyor belt. For simplicity only, one diverter station 28 is shown in detail in FIG. 1, it being understood that all of the diverter stations are constructed in a like or similar manner. The flux-gate magnetometer type of static reading heads 30 are stationarily disposed immediately below the belt 10 such that they respectively intercept the fields of the residual magnetizations of the recorded portions in the belt 10. While such devices are known in the arts, they will be later fully described.

The output terminals of the heads 30 are connected to the AND circuit 32, the single output signal of which passes through the photo cell 34 and which is suitably amplified by the amplifier 36 to energize a relay coil 38 upon detection of a predetermined code. It is understood that the heads 30 respective outputs should be suitably amplified before applied to the AND circuit 32, which in practice may consist of the usual diode voltage coincidence circuit.

It has been found that in utilizing the later described belt 10 memory media the erase station 12 was not completely effective to cause the magnetization of the media to be uniformally aligned in the one direction. Since the heads 30 are continuously operative, in severe cases of magnetization variations the heads 30 have produced extraneous signals causing the station 28 diverter mechanism to be actuated as if a true recorded code were detested. It should be readily apparent that this could cause misrouting of some of the items or packages being conveyed. For the latter reason the photo cell 34 is added as a safety feature to ensure that each of the stations 28 will be actuated only when a package P′ is adjacent the cell 34 for causing the impedance thereof to become low for effectively coupling the heads 30 to the relay 38 hereinbefore described.

The actuation of a station 28 diverter means in response to the AND circuit 32 detection of a predetermined recorded code will now be described. A set of relay contacts 38A operatively associated with the relay coil 38 are closed for completing electrical circuit from the power source 40 through the reversing motor 42 which has a diverter arm 44 non-rotatably secured to its shaft. It is understood, of course, that the arm 44 may be gearingly associated with the motor 42 to effect the same result. Referring now to FIG. 3, the just described circuit actuates the motor 42 which swings the arm 44 from the position indicated by the numeral 44A to the illustrated diverting position 44B. The normally closed limit switch 46 is opened to stop the motor 42 by the arm extension 44C when it is in the position 44B to keep the arm 44 in said position. It should be apparent that as the package P′ is carried by the belt 10 it will slidably engage the arm 44 causing the package to move to the second belt or conveying means 48.

The completion of the transfer of the package P′ from the belt 10 to the belt 48 is indicated by the photo cell 50 detecting the presence of the package P′. The cell 50, as well as the above described cells 24 and 34, is preferably of the interrupt type, that is, the package P′ will block or interrupt the beam 50B extending from the two portions of the cell 50. It may be noted at this time that the cells 24, 34 and 50 are constructed and operated in a manner to serve the purpose of limit switches.

For simplicity the cell 50 in relation to the FIG. 1 station 28 circuit is represented by a pair of normally opened relay contacts 50A, it being understood that the cell when presenting a high impedance acts to break the circuit in a like and equivalent manner. A second normally closed limit switch 52 is disposed in actuating relation to the portion 44C (FIG. 3) and is opened as the arm 44 reaches the "non-diverting" position 44A. Accordingly, when the symbolic contacts 50A are closed by the cell 50, power is applied to the motor 42 for rotating it in the reverse direction to swing the arm 44 from the position 44B to the position 44A where power is removed from the motor by the switch 52 opening. Since the package P′ may pass by the cell 50 before the arm 44 has been fully returned to the non-diverting position, a holding relay 54 is actuated upon the initial closing of the contact 50A and which closes the hold contacts 54A for maintaining electrical continuity until the switch 52 breaks the circuit.

The recording media will now be fully described with more particular reference being paid to FIG. 2. At the top of this figure a portion of the belt 10 is shown in transverse cross section as comprising a non-conducting upper and lower portions 56 separated by a multiplicity of longitudinally extending steel cables 58. The portions 56 may be woven fibre as found in power transmission belts. The cables 58 are placed side by side completely across the belt 10 and extend longitudinally with the belt in an endless manner. It is seen that the cables 58, in effect, provide a flexible sheet of magnetic material integrally associated with the belt 10. Since the cables 58 are constructed of piano wire type material they exhibit a degree of residual magnetization in each of the two magnetization directions and as such can record binary digital signals. Alternately a wire mesh may be substituted for the cables 58 or the belt 10 may consist of a flexible steel belt. In any event the formed memory media is effectively continuous to provide for random recording thereon.

Each of the recording or magnetizing heads comprises a coil 60 having an axis extending transversely to the belt length. As shown the magnetic record comprises a plurality of magnetic dipoles 63 spaced transversely on the belt 10 adjacent the leading edge of the package P. It is understood that the recorded code may be placed on the belt 10 in any predetermined relation to the package P that may be advantageous for each particular system and with the residual magnetization aligned along any axis in the media 58. Each of the coils or windings 60 are connected to the respective reversing switches 62 which constitutes in the illustrated embodiment the means for selectively reversing the currents in the winding 60 to provide binary digital recordings. It is to be understood that the switches 62 may be integrally associated with the keyboard 18 and in a practical embodiment each of the switches 62 may consist of a plurality of contacts on the keys (not shown) of the keyboard 18.

As shown the closure of the photo cell 24 symbolic contacts 24A will cause current to flow in each of the windings 60 the direction of which is determined respectively by the switches 62. In this manner the respective memory media portions, as indicated by the two-way arrows 63, are magnetized in a selected one of two directions.

Referring now to FIG. 4 a flux gate reading head will now be described. There is one reading head assembly 64 to detect each of the respective recorded binary digital signals and for transferring same to the AND circuit 32. Each reading head comprises a slotted ring 66 of magnetically permeable material in which an air gap 68 is provided. The gap 68 is disposed along the length of the belt 10 such that the transversely aligned residual magnetization in the cables 58 as indicated by the arrow 63 is required to pass through the high reluctance gap 68, at least the portion thereof which is intercepted by the unit 64. Each of the rings 66 has a bias winding 70 connected across the battery source 72 for providing a bias magnetomotive force (M.M.F.) 73 within the ring 66. The resulting bias flux from the forces 73 divide evenly between the legs formed in the ring 66 by the elongated slot 74. A pair of excitation windings 76 are wound around the respective slot 74 formed legs such that the alternating current therethrough provided by the source 78 results in no net flux around the ring 66, i.e., the windings 76 are wound in an opposing manner. A sense winding 80 is loosely wound over the excitation windings 76 and has one of its respective ends grounded with the other end connected to the AND circuit 32, it being understood that suitable amplification may be interposed between the winding 80 and the circuit 32.

When the residual magnetization indicated by the arrow 63 opposes the bias M.M.F. 73 within the ring 66 there is no net flux transversing the ring 66 and no signal is provided to the AND circuit 32. When the arrow 63 indicated magnetization aids the bias M.M.F. 73 the slot 74 formed legs become saturated when the alternating current flowing through the winding 76 reaches a predetermined magnitude. As a result thereof magnetic flux is forced outwardly of the ring 66 adjacent the said legs and links the winding 80 to induce a pulsating current therein for the AND circuit 32. As aforestated, the residual magnetization contained in the cables 58 in usually in one of two directions as magnetized by the recording heads in assembly 22 of recording station 16.

No signal is provided to the circuit 32 unless one of two conditions are fulfilled, both of which result in the M.M.F.'s 63 and 73 aiding across the gap 68. The first is that the ring 66 be disposed with respect to the cables 58 such that the erase station 12 caused residual magnetization aids the bias M.M.F. 73, which signal has been arbitrarily defined as a binary zero indication. The second case is for indicating a binary one, such as would be recorded by the recording station 16 causing the residual magnetization in the cables 58 to be reversed in a predetermined portion. The reversed residual magnetization is intercepted by the ring 66 aids the bias flux 73 resulting in an output signal. It is apparent that any predetermined code can be assigned to one or more of the diverter stations 28 by merely orienting the ring 66 with respect to each of the several magnetizable portions such that an output signal is provided corresponding to the desired binary code as will become apparent.

The AND circuit 32 provides an output signal to the amplifier 36 only when all of the sense windings associated with each particular diverter station provides an output signal. As shown in FIG. 3 the two magnetized portions 82 associated with the package P′ have like directions of residual magnetization as indicated by the arrows 63′ and which are in opposition to the cables 58 erase station 12 recorded magnetizations indicated by the arrows 84. This, of course, will indicate a binary 11 for operating the diverter arm 44 as aforedescribed. Other codes are ineffective to so actuate the diverter arm, while other stations are responsive to such other codes. To change the code for a station, one merely reverses the orientation of the units 64 in the belt transverse direction.

In addition to the above described recorded codes, other types of signals may be so recorded on the cables 58. For example, a pulse indicative of the package P leading-edge can be recorded thereon by providing a capacitor 85 to couple a light decrease indication from the cell 24 to a recording head in the assembly 22. It may be noted that an increase would provide an opposite polarity pulse to merely remagnetize a portion of the cables 58 in the same direction as magnetized by the station 12. By reversing the winding in the last mentioned head, a pulse would be recorded indicating the trailing edge of the package i.e., an increase in light. Further means could be provided to reverse the magnetization of one transverse section 88, (FIG. 3), which is equal to the length of the package P′ by providing suitable light threshold circuits, the details of which are not important to the present invention. It should be apparent that yet other information indicating signals and combinations thereof may be suitably recorded in the cables 58.

A code reading station 86 can be provided on the conveying means 48 for checking the code 82 as read by the station 28 to ensure that the package P′ has been properly routed. Upon a difference in the readings suitable alarm mechanisms can be actuated.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. For a conveying system having an endless belt for conveying items and with a magnetizable member integrally associated therewith throughout its extent and having at least two residual magnetization states, erase means disposed in closely spaced relation to the belt for magnetizing the member to one of its two residual states, recording means and being in closely spaced relation to the belt for selectively recording signals on the belt, control means operatively associated with the recording means for actuating said recording means such that a recording is generated in predetermined relationship to an item being conveyed, a plurality of diverter stations spaced along the belt, each of said stations having recording sensing means with several flux gate magnetometer type of magnetization sensing head disposed in closely spaced relation to the belt for sensing the residual magnetization in the cables, and an AND circuit connected to the heads for detecting and indicating to the station a predetermined combination of recorded signals sensed by the heads.

2. Apparatus as in the claim 1 wherein photoelectric item sensing means is included in the diverter stations for inhibiting the AND circuit indication until one item is sensed thereby.

3. Apparatus as in the claim 1 wherein conveying means are disposed adjacent one of the diverter stations and including a duplicate record sensing means for reproducing the indication of the predetermined combination for checking the operation of the one diverter station.

4. In a conveyor system having longitudinally moving conveying means for transporting items on a conveying surface and including a longitudinally continuous and two-state magnetic memory media integrally associated therewith, a plurality of stations adjacent the means and each having magnetic transducing heads disposed in closely spaced relation to the media, a first one of said stations being operative to magnetize the media to one of its two states as the means passes the latter station, a second one of the stations having an item detecting and indicating device and operator actuated code selecting device connected to a magnetic recording mechanism disposed in closely spaced relation to the media for recording a signal code therein as selected in the operator's device when the item device is providing an indication that an item has been detected, and a third one of said stations having flux gate magnetometer magnetic record sensing means disposed in closely spaced relation to the media for detecting and indicating only one combination of a plurality of recorded signals and with diverter means responsive to said indication for removing the item from the conveying means.

5. For a conveying system having an endless belt for conveying items and with a magnetizable member integrally associated therewith throughout its extent and having at least two residual magnetization states, erase means disposed in closely spaced relation to the belt for magnetizing the member to one of its two residual states, recording means positioned in proximity to the belt for selectively recording signals on the belt, control means operatively associated with the recording means for actuating said recording means such that a recording is generated in predetermined relationship to an item being conveyed, a plurality of diverter stations spaced along the belt, each of said stations having recording sensing means having a plurality of flux gate magnetometer type of magnetization sensing heads disposed in proximity to the belt for sensing the residual magnetization in the magnetizable member.

6. In apparatus of the class above described, an endless belt including a continuous magnetizable recording medium therein, means for magnetically recording a coded address thereon in proximity to an article to be diverted from said conveyor, a plurality of diverting stations, each of said stations including means for detecting a predetermined address and diverting an article in response thereto, said detecting means including an AND circuit connected to a plurality of magnetic recording sensing devices and address sensing means are disposed adjacent each of said diverter stations and the diverter recording sensing means and the adjacent recording sensing means are connected to comparison means for checking the operation of the diverter station.

References Cited in the file of this patent

UNITED STATES PATENTS

| | | |
|---|---|---|
| 2,696,921 | Desjardins | Dec. 14, 1954 |
| 2,784,851 | Bretschneider | Mar. 12, 1957 |
| 2,825,476 | Muller | Mar. 4, 1958 |
| 2,857,059 | Goerlich | Oct. 21, 1958 |
| 2,990,965 | Smoll | July 4, 1961 |
| 2,993,596 | Steinbuch | July 25, 1961 |